United States Patent [19]

Guenther et al.

[11] Patent Number: 5,086,510
[45] Date of Patent: Feb. 4, 1992

[54] MULTI-CHOICE INFORMATION SYSTEM FOR A MOTOR VEHICLE

[75] Inventors: Clemens Guenther, Sexau; Ralf Eck, Frankfurt/M; Christa Heiland-Franzen, Eggenstein-Leo; Peter Knoll, Ettlingen; Winfried Koenig, Pfinztal-Berghausen; Georg Geiser, Karlsruhe; Rudolf Haller, Karlsbad; Udo Brunke, Diekholzen; Rudolph Vollmer, Barienrode, all of Fed. Rep. of Germany

[73] Assignee: Robert Bosch GmbH, Stuttgart, Fed. Rep. of Germany

[21] Appl. No.: 452,606

[22] Filed: Dec. 18, 1989

[30] Foreign Application Priority Data

Dec. 16, 1988 [DE] Fed. Rep. of Germany ....... 3842413
Dec. 16, 1988 [DE] Fed. Rep. of Germany ....... 3842414
Dec. 16, 1988 [DE] Fed. Rep. of Germany ....... 3842417

[51] Int. Cl.$^5$ ............................................. H01Q 7/04
[52] U.S. Cl. ...................................... 455/90; 455/128; 455/345; 455/347
[58] Field of Search ................... 455/89, 90, 346, 152, 455/351, 347, 603, 345; 379/58, 428

[56] References Cited

U.S. PATENT DOCUMENTS 4,868,862 9/1989 Ryoichi et al. .................. 455/90
4,881,258 11/1989 Kaiwa et al. ..................... 379/58

FOREIGN PATENT DOCUMENTS 3514438 9/1986 Fed. Rep. of Germany .
2216319 10/1989 United Kingdom ................. 379/58

OTHER PUBLICATIONS

Bosch Techn. Berichte, vol. 8, 1986, pp. 39–46.

Primary Examiner—Curtis Kuntz
Attorney, Agent, or Firm—Frishauf, Holtz, Goodman & Woodward

[57] ABSTRACT

A visual display monitor of an information system of a motor vehicle is connected not only with the usual engine and vehicle instrumentation, but also with a variety of electrical equipments installed in the motor vehicle which the driver may want to activate and control from time to time. The picture screen of the monitor, preferably of the LCD, electro-luminescence or plasma type, is subdivided into a report region at the top and a region for interactive information such as instructions menus and operation results. All the functions that would otherwise be performed by individual buttons, knobs and switches of the various equipments installed in the vehicle may be simply performed by a series of easily designated choices. One input device has a ball control for directing a cursor on the screen of the monitor, a menu button and an entry button, and may be located on the steering wheel. While a particular equipment that has been selected is being controlled, the corresponding field of the monitor selected by the cursor has its light-to-dark contrast reversed, to indicate that the corresponding equipment is in the process of being adjusted or controlled. Another input device is combined with a telephone handset used for telephone calls and has a recessed alphanumeric keyboard in its back for more detailed entries into the system. The information system is built around a digital speech memory which not only provides telephone answering messages and the like but also makes possible audible outputs of the system through the radio receiver's loudspeaker so that the driver can be less dependent on visual outputs displayed on the monitor.

5 Claims, 10 Drawing Sheets

MULTI-CHOICE INFORMATION SYSTEM FOR A MOTOR VEHICLE

Cross-reference to co-pending application: U.S. Ser. No. 07/274,654, now U.S. Pat. No. 4,888,699, Peter KNOLL et al., Vehicular Navigation System, filed Nov. 21, 1988.

This invention concerns a vehicular information system of the kind in which an input device is connected to a monitor which can visually display information of selected kinds. It concerns also input devices linked to the rest of the system by cordless means which are usable with little visual attention and little manual dexterity. It also concerns a versatile speech memory forming part of the system.

A vehicular information system is known from Bosch Technische Berichte, vol. 8, 1986, issue 1/2 pages 39 to 46, which describes a monitor on which operating data of the motor vehicle, for example temperatures, oil change intervals and tire pressure can be shown. The picture screen of the monitor in that system can be switched for displaying other data, for example navigation data from a navigation system, or travel route data.

In that system there is the inconvenience that the picture screen of the monitor must be switched over for displaying the information supplied by individual electrical equipments and signal sources. The required switching of the information to be displayed impairs the easy observability of the information. Moreover, since, in addition, separate indicators are required relating to headlights, brake lights, oil pressure etc. or to the radio receiver in the vehicle, the cost of the complete system is relatively high.

As a result of the multiplicity of indicators, knobs and switches in the region of the dashboard or of the console serving a similar purpose, it is easy for manipulation errors to occur. To avoid such errors the driver must at times be intensively concerned with manually operable elements such as pushbuttons, switches and knobs, as a result of which his attention is diverted from road traffic and occassionally there is substantial risk of accident.

Interactive input devices for moving a cursor on a monitor utilizing a ball rotatable in any direction controlling transducers resolving the rotation with respect to two perpendicular axes are known as elements of computer keyboards, where the outputs are linked by wiring to the computer.

Mobile telephone handsets are also already known in which called numbers can be designated by a keyboard (button pad) on the handset. Such handsets are usually connected with the mobile telephone unit by a cable.

The known handset input devices for mobile telephone units are equipped only for operating the mobile telephone equipment. Other input devices with corresponding keyboards and switches are necessary for serving other electrical equipment, as for example radio receiver for broadcast information, a system for navigation and pathfinding, heating or air conditioning installations, and so on. These additional input devices need to be disposed within reach of the driver and are preferably located on the dashboard or in a console in a middle position in front of, or between, the front seat or seats.

The many keys (buttons) and switches are relatively expensive to make and to build into the motor vehicle structure. Their manipulation, moreover, is inconvenient for rapid eye-and-hand coordination. The diversion from attention to traffic caused by attention to these devices is far from negligible, particularly in the case of inexperienced drivers, thus increasing the risk of accident.

Digital speech memories for supplying information to the driver of a vehicle are already known which are built into a radio broadcast receiver equipped with a traffic broadcast decoder. In such a digital speech memory all traffic announcements fitting within an adjustable time window can be stored and then called out as often as desired. An unfavorable aspect of this known equipment is that the digital speech memory does not optimally use its small memory capacity, because it cannot recognize which information is already stale and may therefore be overwritten. Furthermore, the countless control elements and indications of that equipment are inconvenient to observe and have the affect of easily diverting the driver's attention from road traffic.

Cassette equipment for recording broadcast transmissions are also known. They have the disadvantage of the recordings on a magnetic tape generally require an excessively long search time to find them, because direct access such as is used in a digital data memory is not available. The storing of information on a magnetic tape, of course, is performed sequentially.

SUMMARY OF THE INVENTION

It is an object of the present invention to enable all necessary and currently desired information to be displayed concurrently while avoiding confusion of the observer, who is usually the driver of the vehicle, when he or she has only brief moments to observe the information.

It is a further object of the invention to provide cordless input devices effectively usable with little attention by the driver and requiring only one hand to manipulate the device, and also a cordless device also usable by a passenger, in each case utilizing the monitor for easily verified registration of an input and for informing the user of a choice of next inputs. It is a still further object of the invention to provide speech memory means not only for such conventional purposes as an announcement to a telephone caller while the driver is busy, but also for audible annoucement of coded broadcast traffic advice, piloting instructions from a navigational system, or even responses to manual inputs to the system, in order to dispense with or supplement visual signals or displays that would divert a car driver's attention from the road. It is also an object of the invention to provide a speech memory having a storage capacity that can be optimally utilized in a vehicular system and does not limit its capacity for each of the various kinds of information.

Firstly, the display screen of the monitor is permanently divided into a report region for display of information for the driver without requiring him to call for it, and at least one other distinct region for information selectively called up including, at times call-up choices. In one embodiment there is an equipment selection region subdivided into fields relating to corresponding equipment which the driver may from time to time wish to activate, deactivate or control.

The invention has the advantage of reducing the amount of attention the driver would be likely to divert from the road and also the intensity of concentration when the driver needs to perform manual operations of switches and of other controls. The operations region of the monitor has the advantage that the immediate choices are presented in succession in dealing with a selected equipment, for response at each stage by a simple method of selection, making both manipulation and observation easy and quick and enabling errors to be easily recognized and corrected.

The arrangement of the distinct regions of the monitor one above the other further simplifies observation of the monitor, since it is necessary the normal monitoring of the vehicle to continue during control adjustments of electrical equipment for and likewise to continue the visible designation of the equipment that may have been selected for adjustment or activation, since the driver is likely to abandon an operation before it is completed, so that when his attention is again available, he can quickly be notified what equipment was previously in the process of being operated and also the stage of adjustment or other operation that had been reached. This system of controlling auxiliary equipment in the vehicle is also convenient for inexperienced users since each step is distinctly presented to the user for a simple response.

It is desirable for plainly showing the field corresponding to a selected operation, to invert the light-to-dark contrast of a selected field, so that it will stand out from those not selected.

It is particularly advantageous to provide for the selection of fields, and for the selection of menu items, by means of a cursor control element easy to manipulate. For visibility of the information on a monitor located in a vehicle, the use of liquid crystal devices (LCD), electro-luminescence or plasma technology is preferable, especially since these technologies involve less energy consumption that a cathode ray picture tube.

It is advantageous to install the manual input device on a strut of the steering wheel of the vehicle, since the preferred input device requires little space and such a position makes it easily reached and operated. An infrared transmission link between the input device and the remainder of the system is also advantageous since the location is suitable for such a link and it is desirable to avoid the likelihood of damage to cabling in this portion of the vehicle.

Secondly, on the reverse side of a mobile telephone handset an input keyboard is provided that is composed of a first input field having an alphanumeric keyboard portion and a second input field having an equipment-designating keyboard portion. The handset, instead of being connected by cable to equipment mounted in the vehicle, is equipped for wireless data transmission and reception. Preferably that communication link utilizes an infrared beam for wireless transmission. Preferably, still another keyboard field is provided for a menu field control, in which finger-touch controls are of the kind required for directing a cursor for interaction with a monitor mounted on the vehicle dashboard.

The advantage of the invention is that the necessary manual switches and keys are collected on a portable input device, within the reach of the fingers of the one hand that holds the device. The device merely needs, for this purpose, to be grasped to put the fingers on the reverse side of a telephone handset. In this way the selection among the electrical devices with which the vehicle is equipped and the operation of these devices are made easier to initiate and to perform in a simple manner with a minimum of optical attention.

It is also important that the data transmission between the input device and the information system of the vehicle is performed by a wireless link, rather than by a cable which is frequently inconvenient. Furthermore, the input device can be used by any of the occupants of an ordinary passenger vehicle or at least any of those seated in front, because of its portable nature. Thus a passenger would be able to control a radio, or a heater, or an air conditioner for a desired setting without disturbing the driver. It is particularly advantageous to provide a menu-responsive input field by which a selection of desired equipment functions can be simplified by the use of a cursor control element for a dialogue with a monitor provided on the dashboard. That has the great advantage that no tedious entry of data by means of an alphanumeric keyboard is required to make the simple choices so easily made with a cursor on a monitor.

Comfortable data transmission to a communication installation in the vehicle interior can be accomplished by the use of infrared rays as the transmission medium. Infrared transceivers are insensitive to disturbances, a feature that is particularly advantageous in a motor vehicle where there are a good many disturbing electromagnetic fields.

A further advantage can be obtained if the keyboard of the input device is recessed with respect to the handset casing or provided with a protective cover, so that undesired actuation of the keyboard can be avoided.

It is also advantageous for the input device to be held in a particular place when not in use, so that it does not get displaced back and forth during travel. This is particularly advantageous when the ready storage place is a tubular case or sheath, for example plastic of low flexibility, preferably set in the vehicle's dashboard. The holding sheath should have a configuration such that a portion of the input device remains visible, so that, for example, the cursor control elements can be manipulated. That facilitates the use of the input device, especially if the vehicle is in motion, since in that way the attention of the driver is hardly diverted at all from the observation of events on the road. He or she can manipulate the cursor control elements without needing to look at them. This cursor control makes the installation of such a control on the steering wheel unnecessary, but it is still desirable to provide such a control on the steering wheel to give the driver a choice, although that may be more difficult when the vehicle was not so equipped when it was new.

Thirdly, the digital speech memory is subdivided into memory portions which can be overwritten and memory portions that may not be overwritten. Furthermore the size of the respective portions is variable according to the information to be stored and a memory portion selector is provided for administering the memory portions of the digital memory which are available either by overwriting or by virtue of being vacant.

The advantage of the invention is that important information such as traffic announcements, telephone conversations, telephone numbers or other information can be stored in the digital speech memory which has access to all information-related equipments installed in the vehicle. Each of the above-mentioned memory portions are preferably allocated to a particular equipment in the vehicle. For example a memory portion reserved for traffic announcement data can advantageously be overwritten only after the traffic information has been called out in speech and is no longer needed. Another memory portion is reserved for telephone messages of the mobile telephone. In this memory portion both incoming conversation as well as telephone announcements can conveniently be stored. It is furthermore advantageous that the memory portions or storage regions have no fixed boundaries but can be extended according to need and that unused memory capacity can be allocated to some particular memory portion that needs it.

In a preferred embodiment the digital speech memory of the invention is a semiconductor memory, which has the advantages over floppy magnetic discs, for example, of providing more rapid access to information with a longer trouble-free life since no mechanical devices subject to wear are involved. It is also advantageous to connect the digital speech memory to a switching matrix, which may also be implemented by one or more semi-conductor devices, since the provision of such a matrix greatly simplifies the interconnecting wiring for the various individual equipments installed in the motor vehicle. These equipments, such as auto radio, mobile telephone, CD player, navigation system and alarm system can be controlled and can transfer data to the digital speech memory with simple connections of the switching matrix. An extension of the information system by connection of additional equipments can also be carried out without great installation expense because the presence of the switching matrix, which is preferably programmable.

The speech memory of the invention can advantageously make use of the loud speaker of the auto radio as an acoustic output. Since the digital speech memory is controllable by external control signals which may be provided for example from a data input device, vacant memory capacity can advantageously be chosen for storage of important information without requiring that the new important information should be written over already stored information of the same or some other kind, the usefulness of which may not have ended.

By the subdivision of the digital data memory into a number of memory regions, the undesired loss of data in the individual equipments by writing over with new data can be prevented. It is advantageous that the memory regions for warning announcements, announcement text and messages can be written over only by data of the same type, since older traffic announcements which are recognizable by their date and time are the most eligible of all data for being overwritten. The memory capacity can be fitted to the amount of data to be stored to great advantage.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1:
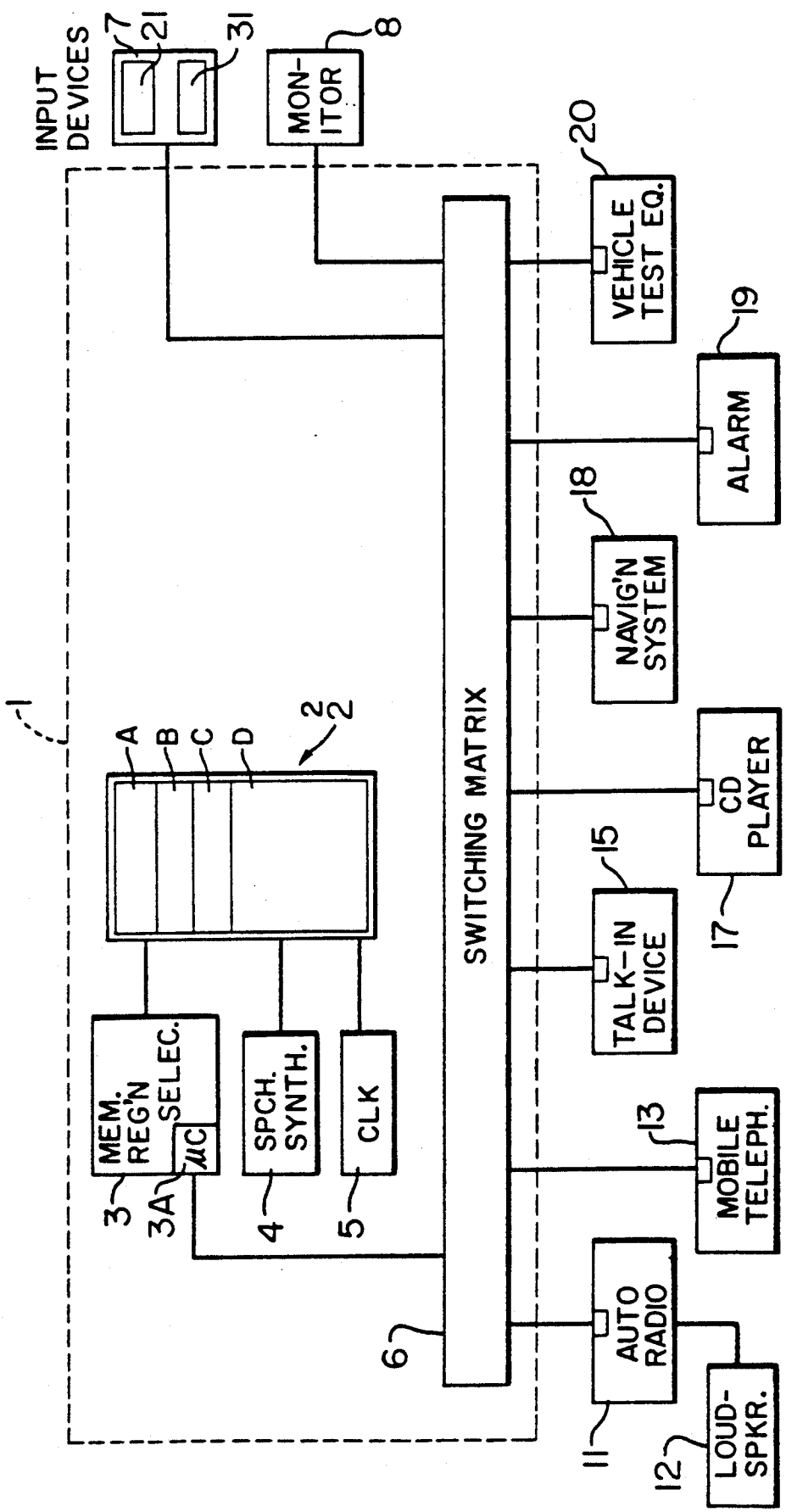
FIG. 1 is a block diagram of a multi-choice information system for a motor vehicle according to the invention illustrating the extent of applicability of the invention.

The circuit block diagram of FIG. 1 represent an example of a fully developed information system according to the invention. It shows primarily a digital speech memory 2 that is subdivided into memory portions or regions A, B, C and D. The speech memory 2 is also connected to a microcomputer 2A which also controls the switching matrix 6 a memory region selector 3, a speech synthesizer 4 and a clock 5. The digital memory is also connected over data lines and control lines to a switching matrix 6 that has many connections extending to a number of peripheral equipments. As such external equipments, there are shown in FIG. 1 an auto radio 11 with a loud speaker 12, a mobile telephone 13, a talk-in device 15, a CD player 17, a location and navigation system 18, an alarm system 19 and a vehicle test equipment 20. The talk-in device 15 is a microphone and speaker device such as are used for "no hand" telephone conversations. It could use the speaker of the auto radio. A data input device 7 is provided having one input unit 21 of the kind shown in FIG. 3 and one input unit 31 of the kind partly visible in FIG. 4 and fully shown in FIGS. 5 and 6. Both of these units have manual control elements 22, 23, 24 for, and related to, controlling a cursor. For optical output of data and information the data display unit 8 is provided, by which, in a selective manner, the data of all the equipments connected into the system can be shown.

The manner of operation of the system and more particularly of the digital speech memory will now be described.

Figure 7:
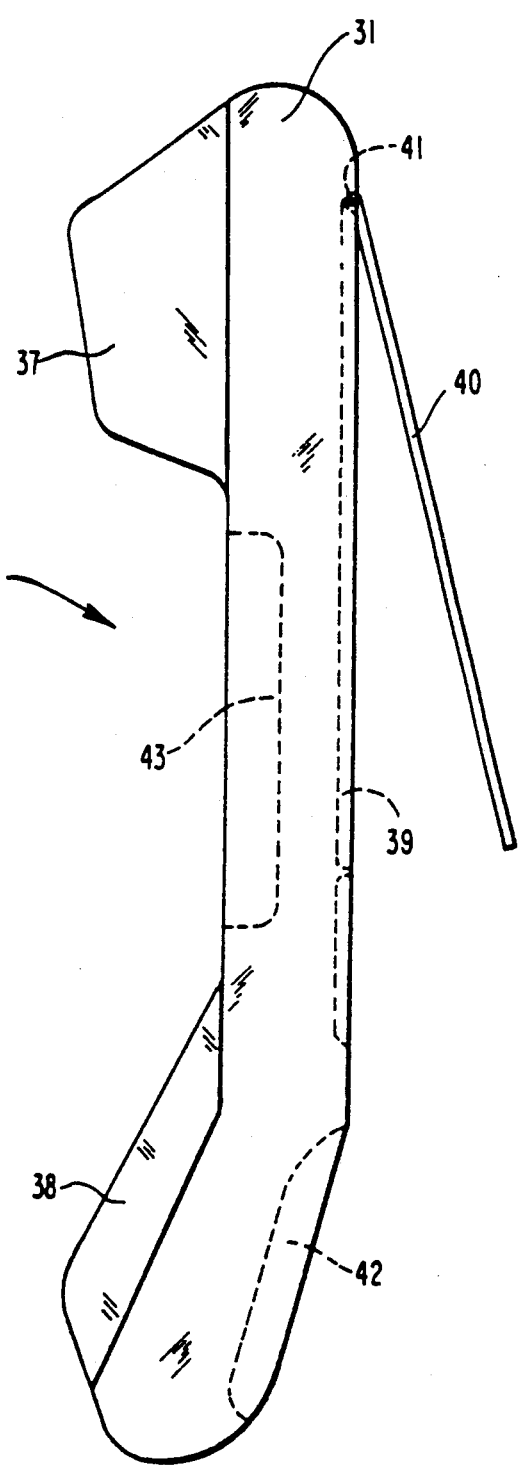
FIG. 7 is a side view of a hand-held cordless input unit, part of which is visible in FIG. 5.

Selective access to any one of the peripheral equipments 11–20 is available by means of one of the two data inputs 21 and 31 which are designated collectively in FIG. 1 as the data input 7. In the selection of an equipment, there is accomplished automatically the switching through of the necessary data and control lines to the digital speech memory 2 and to the further units connected to it, as for example the switching matrix 6 and the memory region selector 3. The selection of one of the equipments 11–20 is performed either by a keyboard input or by control of a cursor in the menu field 83 of the monitor 8 (FIG. 7). Of course other input devices could also be used, as for example light pens, an input board or a speech-controlled input system.

If for example the auto radio 11 is selected, there may appear, in the upper or report region 81 of the monitor 8, the principal function indications of the auto radio such as tuning, volume, tone and, if possible, the station that is at the moment tuned. It can also be shown, for example, whether the station to which the radio is tuned is transmitting traffic announcements. In that case, a traffic broadcast decoder is connected through the switching matrix 6 to the digital speech memory, which records the transmitted traffic announcement, and may call attention to the recording by a small visual or audible signal. This recording can be called out as often as desired and reproduced acoustically over the loudspeaker 12, or visibly displayed on the monitor 8.

In the same way other equipments 13-20 can be selected and put into operation. If the location and navigation system 18 is selected, the driver then enters the desired travel route and destination by meanns of the data input 7. The actions carried out by and for him are displayed in the middle region, the operations region 82, of the monitor 8. Here the travel and position information of the navigation system can also be displayed. Complementary information such as for example the time of day and the date, or data specific to the vehicle, are shown in the report region 81 of the monitor 8.

Figure 2A:
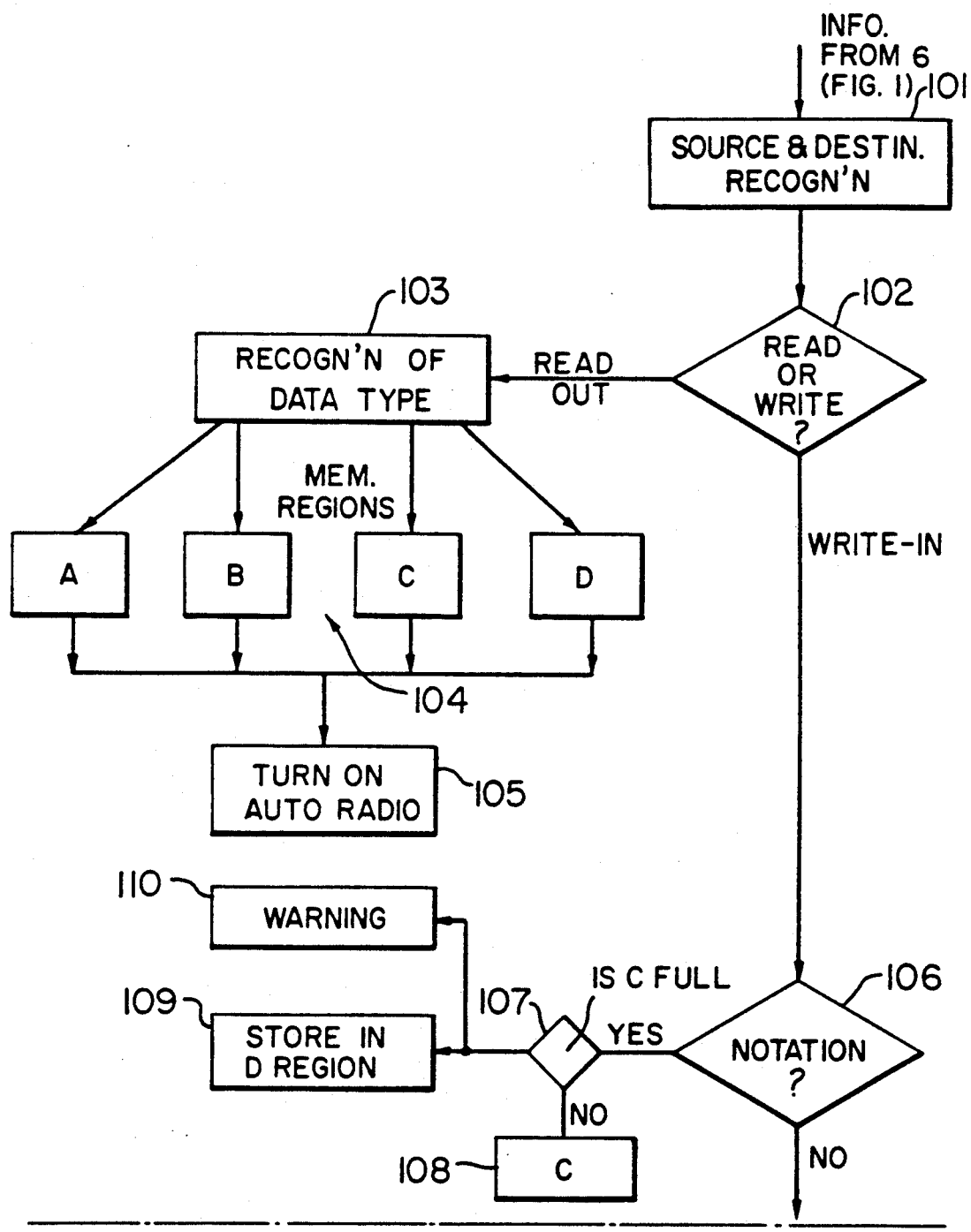
FIG. 2 is a flow diagram illustrating the use of characteristics of a speech memory usable in an information system for a motor vehicle according to the invention.
Figure 2B:
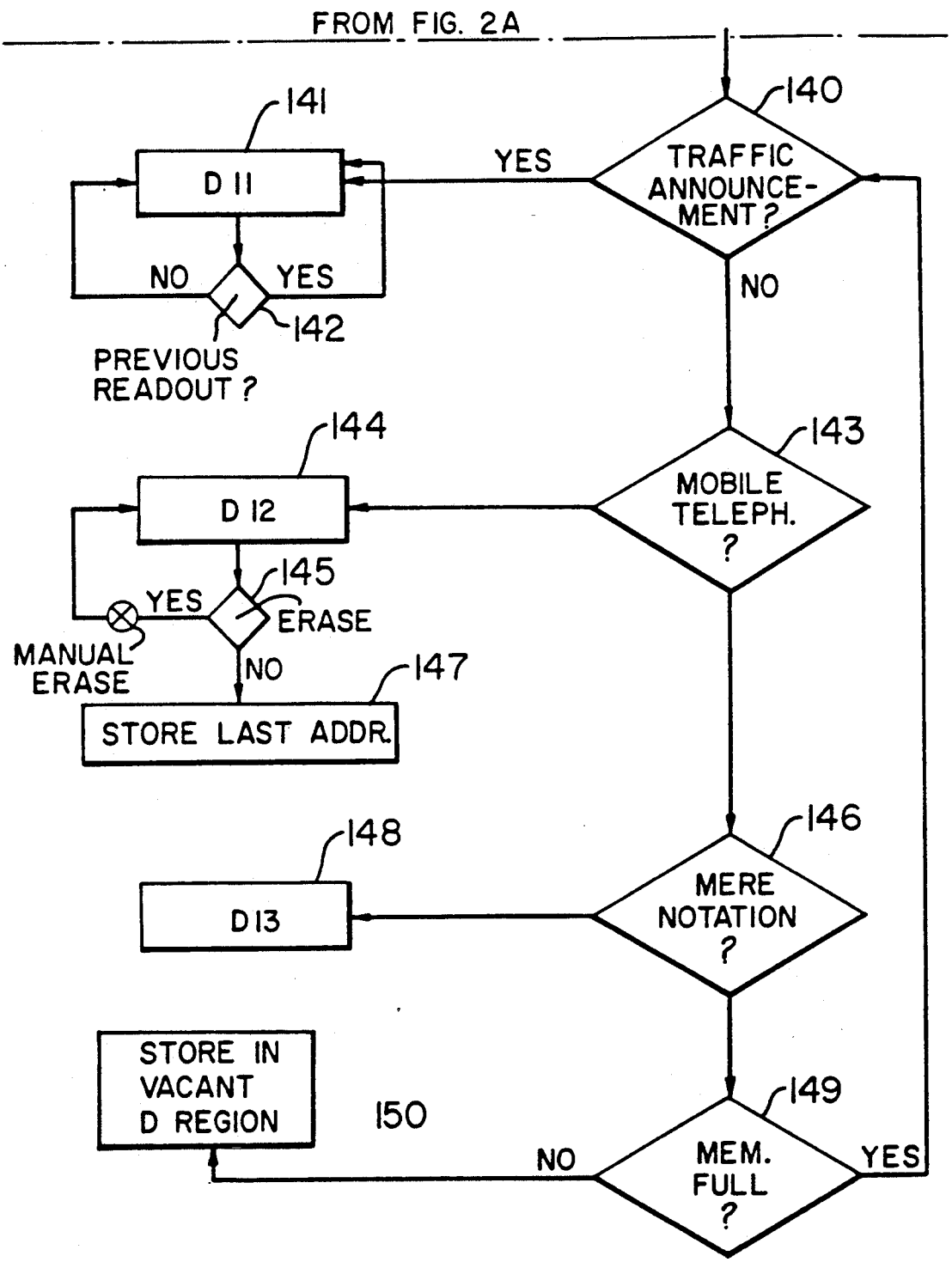

The signal lines connected to the outputs of the several devices 11-20 are connected with the switching matrix 6, which connects the currently selected equipment with the digital speech memory 2. This memory, which is partly subject to overwriting and partly inaccessible for overwriting, is subdivided into regions A, B, C, and D. The region selector 3 and the digital speech memory 2 have a central significance for the overall system shown in FIG. 1. As shown in FIG. 2 a capability is provided for allocating a memory region permanently to each of the individual equipments 11, 13, 15 in order on the one hand to maintain the memory capacity of this memory within economical limits and on the other hand to be able to utilize the available memory in an optimal fashion. The remaining memory is organized as a variable memory that can be written into when the fixedly allocated memory regions are fully written into. The variable memory can be written into by many of the equipments 11-20 according to certain rules which involve the establishment of defined priorities. The administration of the memory as a whole, as well as the application of the overwriting rules for the digital speech memory 2, is organized by the memory region selector 3.

In the illustrated example of the operation of the system, a non-overwriteable memory region A, reserved for warning data is first selected. A warning announcement is read out from it, for example a travel instruction such as "bear left" or information texts such as "caution: slippery ice." This warning memory portion also contains warning data that may be made to appear automatically by a vehicle test equipment 20 or an alarm system 19. These data are not subject to overwriting and they contain preformulated attention-getting words or symbols. Adjacent to this memory region is an overwriteable region B for a stored announcement text. This announcement is needed in order to give a telephone caller a message when the driver is not available to talk. The telephone answering announcement memory region is relatively small and the text of the announcement can be altered at any time. The region B with the announcement text data is exclusively allocated to the mobile telephone equipment 13, and the remaining equipments accordingly have no access to this region B.

Adjoining the memory region B is the region C providing a memory which can be overwritten at any time and is for the storage of notations. It is connectable to the talk-in device 15 or to the data input unit 7. If the talk-in device 15 is selected by an entry through the data input 7, the talk-in device 15 (which is a microcohone either provided with a loudspeaker for responses or utilizing the speaker of the auto radio for that purpose) is connected with the digital speech memory 2 in order to store, for example, personal data, telephone numbers, addresses or similar miscellaneous information. This memory region has only a relatively small capacity. Individual notations or data can be erased either automatically or manually, or simply by being overwrittent with new input.

The regions of the digital speech memory abovedescribed utilize only a relatively small part of the available memory. They are of a size that is insufficient in normal use. If additional data is to be stored, especially traffic announcements, which are frequently renewed and only of relatively short term is significance, such information can be written into the variable memory D that encompasses the remainder of the memory capacity.

The variable memory D has a portions subdivided into blocks into which information such as traffic announcements are written. For these a minimum amount of memory is reserved. The variable memory D is of multiple utility. If the memory regions for telephone announcement and for notations of various kinds are fully written into, additional information of those kinds can be written into the variable memory D. The region selector 3 switches the external equipments 11 and 13 and the data input 7 as needed over the switching matrix 6 to the variable memory D. In the case of traffic announcements, the variable memory D is activated with a traffic announcement signal. If no data has yet been stored in it, it is filled with traffic announcement data, block by block, until it is full. The memory is switched out at the end of a traffic announcement signal. The remaining memory capacity is now available for other equipments, for example for notations, calls or telephone announcement text data. If the memory capacity is not sufficient, which can happen as a result of further traffic announcements, a check is made to find what data of earlier traffic announcements are over-aged and can therefore be written over. The criterion for overwriting is whether the earlier traffic announcement has already been listened to. For this purpose all data stored in memory are coded so that the region selector 3 can determine in a simple way the recency of the data.

If portions of the variable memory D are filled with telephone calls, then these memory portions are not subject to being overwritten by a new traffic announcement. The data of telephone calls have priority over all other data. They can be erased only manually.

In a similar way the additional notations of a miscellaneous character are stored in vacant regions of the variable memory D. These also can be written in memory space previously occupied by older traffic announcements if the memory region assigned to notations is insufficient. They are not automatically subject to being overwritten by traffic announcements. They can be erased only manually.

Telephone annoucement text data can be stored in the variable memory D in the same way as notations. These also are erasable only manually and are not permitted to be automatically overwritten by traffic annoucements.

Of course this memory system is extendible for the connection of additional equipments in the vehicle external to memory system 1 of FIG. 1. By assigning a code to the individual equipments, it is made possible for the region selector 3 to recognize the type of data to be stored and the correct allocation of the data to one of the memory regions A, B, C and D. Since the different data types are mixed together in storage in the variable memory D, this coding makes it possible to retrieve them in a simple way for read-out and likewise to rank them by how recent they respectively are.

The function of the region selector 3 as here described is such that its implementation in hardware and software is evident to those skilled in the art and does not need to be described here, beyond the description of the flow chart of FIG. 2 that is given below.

Since a speech synthesizer 4 is also connected to the digital speech memory 2, the output of speech signals takes place through the switching matrix 6 and over the loud speaker 12 of the auto radio 11. In the same way a time of day output can also be performed acoustically through the speech synthesizer 4. In some cases direct storage of the time of day is necessary, for example when traffic announcements are received. The time of day can then be spoken out with the acoustic output of the traffic announcements.

In a variant embodiment of the invention (not shown in the drawings), instead of the provision of a switching matrix 6, every connectable equipment is provided with an addressable input/output portion (that may be referred to as a "interface") which is connected to the digital speech memory 2 by an address and data bus system.

FIG. 2 is a flow diagram illustrating the manner of operation of the system of FIG. 1 and particularly of the memory region selector 3.

The flow diagram begins at the upper right with information coming to the memory from the switching system 6 which as already mentioned may be an address bus and data bus system.

The memory 1 is administered by the memory region selector 3 which contains a microcomputer 3A which has a direct connection to the switching system 6.

When the information arrives from the switching matrix 6 the first processing step is to recognize the source and possibly the destination of the information. In the stage 101 of FIG. 2 it is determined which connected equipment is sending the information or needs to read it, or both. This recognition is performed by simple interrogation of the switching contacts or paths of the switching matrix 6. This information is temporarily stored (not shown in FIG. 2) since it may be helpful in other stages. The next stage is shown at 102 where it is determined whether information is to be read out of the memory 2 or written into it. If for example information is to be read out of the memory 2, then at the location 103 of the flow chart the data type of the information to be read out is checked. In this connection, for example, the information temporarily stored identifying the source and/or destination of the information may be helpful. If now for example the information is a request regarding warning data or navigation information, the inquiry will be directed at stage 104 to a memory region A. In the case of announcement text data of the mobile telephone 13, the inquiry will be directed to region B. If the request is merely regarding notations perviously made, it will be directed to memory region C for retrieval. In the case of traffice announcements and the like the region D of the memory will be consulted. The retrieved information obtained from the appropriate memory region is directed, in stage 105 of FIG. 2, to the speaker of the auto radio for audible read-out. This will require turning at least the audio stage of the automobile radio unless it is already on and merely needs a change of input connection.

If on the other hand at stage 102 it was found that information was to be written into memory, it is then necessary to determine data type in order to be able to select corresponding vacant or overwriteable memory regions C or D. At stage 106 it is first determined whether the information to be stored is merely a notation. If so, stage 107 finds whether memory region C is full or not. If it is not full, the information goes to memory region C and is stored. If it is full, stage 109 provides a warning signal signifying that the information is stored in a region or section of the D portion of the memory.

If the information to be stored is not a mere notation, stage 140 investigates whether it is a traffic announcement. If so it is written into the memory portion D at stage 141. The memory portion D is continuously written into and therefore is continually checked for whether the information has been read out or not, which means that when it is read out it is tagged as having been read out. Position 142 shows the loop in which information is checked for whether it has been read out, resulting in its being directed to an overwriteable portion of the memory D11 or left in a location in which it may not be overwritten.

If the information is not a traffic announcement it is checked at stage 143 as to whether it relates to mobile telephone operation. If it is information of a mobile telephone conversation that needs to be recorded, an additional area, in this case D12 of memory D, is occupied in stage 144. Stages 145 and 147 show that the last written address of this section of memory portion D needs to be determined in order to find whether any more storage space is available there. This prevents a stored conversation from being unintentionally erased. Stage 145 makes it possible to erase manually an already stored conversation in order to make more space available. If the information is neither a traffic announcement nor mobile telephone information, then at stage 146 the notation function is interrogated. Notations are stored in vacant areas of the memory portion D, for example in one of its sections, to the extent that the memory portion C is full (stage 107). As is indicated by the broken line relating to stage 149, this flow diagram of the memory region selector 3 may be supplemented by characterizing other information types. If the information coming to stage 146 from stage 143 can be stored in the same way as a notation and there are no other special classifications to consider, it will be stored in a section of the memory portion D, here designated D13 at stage 148. Finally, in stage 149 it is checked whether the memory D is already full. If it is not further information seeking recording is put to any vacant part the memory D. If it is full there is a return to stage 140, but henceforth regions and sections considered which are overwriteable, as distinguished from vacant. Information that is stale or otherwise erasable is looked for in order to make room for new information.

Figure 3:
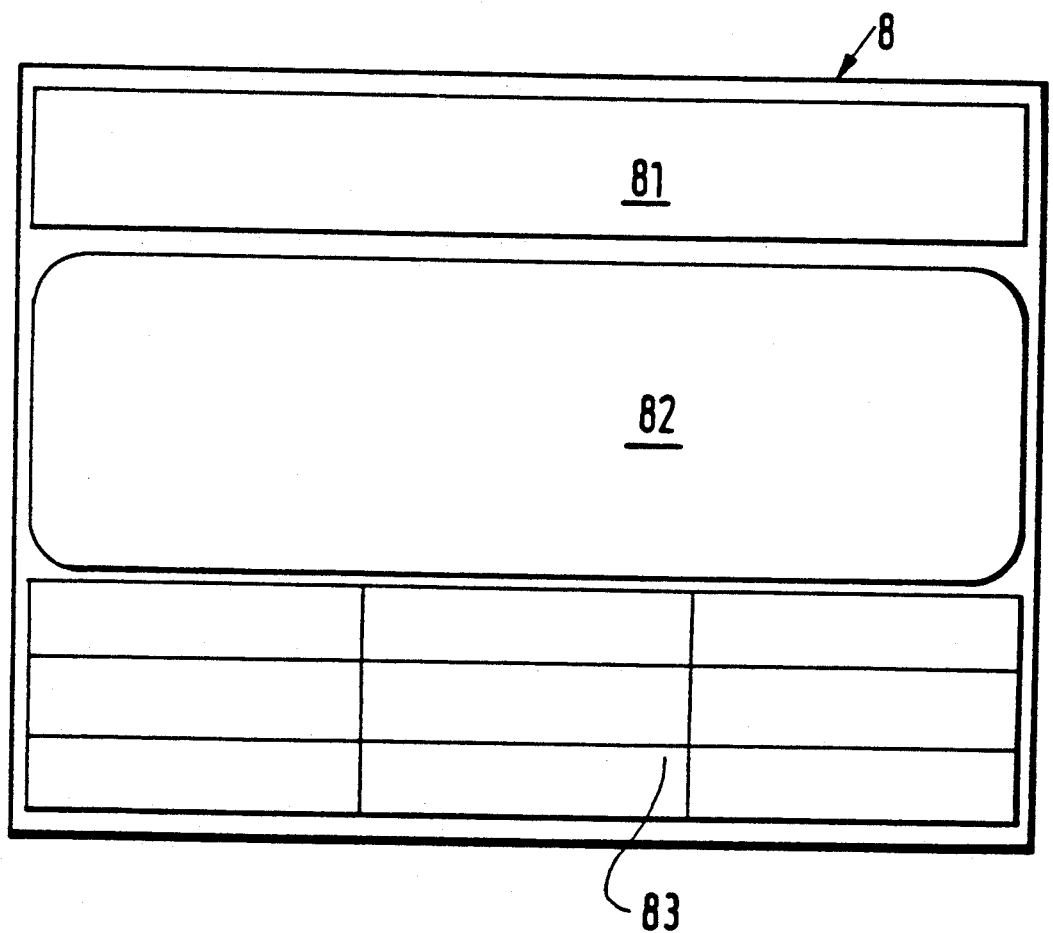
FIG. 3 is a front view of a monitor screen visible in an information system for a motor vehicle according to the invention.

FIG. 3 schematically shows the display screen of the monitor 8 which is used to display information of one version of a vehicular information system according to the invention. The display screen consists essentially of three different regions. From top to bottom, these are a report region 81, an operations region 82 and an equipment selection region 83, located on above the other. The relative or absolute size of the individual regions is not necessarily important, because the size of the regions can be varied to suit the available space and other conditions of a particular vehcile model.

The equipment selection region 83 in the bottom part of the display screen is subdivided into a number of fields of more or less the same size. In the illustrated case they are arranged in rows and columns. The individual fields are (and remain) representative of respective electrical equipments installed in the motor vehicle which may be selected for operation or control. Thus for example the designation PILOT signifies that be selection of this field a built-in navigation system is activated. Other fields are designated HELP!, RADIO, TEL and AIR. The number of the fields is dependent upon the number of electrical equipments built into the motor vehicle. For example there could also be additional electrical equipment such as communication apparatus or vehicle-monitoring devices. Such equipments are in themselves known to persons in the autmotive field and therefore do not need to be further described.

Above the equipment selection region 83 there is located the operations region 82. In this operations region instructions are displayed which facilitate the driver's use of the information system. For example if the field RADIO is selected, a menu of selectable functions appears in the operations region 82, making visible the various control functions of the auto radio. The user can then select an item from this menu, for example radio station selection, and then, in a kind of dialog with the monitor, select a particular broadcasting station. After that the user can then set the loudness, balance, frequency range (tone) and other auto radio adjustments. The menu in each case is suitable to the particular selected electrical equipment and is switched in with the selection of the equipment. After adjusting the radio another equipment may be selected, for example a navigation system selected by a button with a short designation such as PILOT or an acronym of an available system. Then instructions will appear in the operations region 3 of the monitor regarding the present location and the desired destination. After entering the location and the desired destination, the screen is switched to display of a street pattern lying between the present location and the destination. Thereafter the driver, as he continues on his itinerary, will be able to recognize his position at any time on this display in the operations region of the monitor.

Above the operations region 82 is a report region 81. In this report region all of the data which are important for the driver of the motor vehicle are displayed. Not only the motor functions such as oil pressure, oil temperature or tire checking values are displayed, but also which radio station is being received or whether a traffic announcement signal is being received, and the destination entered into a navigation system that is functioning. Of course the date and the time of day or night also displayed here.

Figure 4:
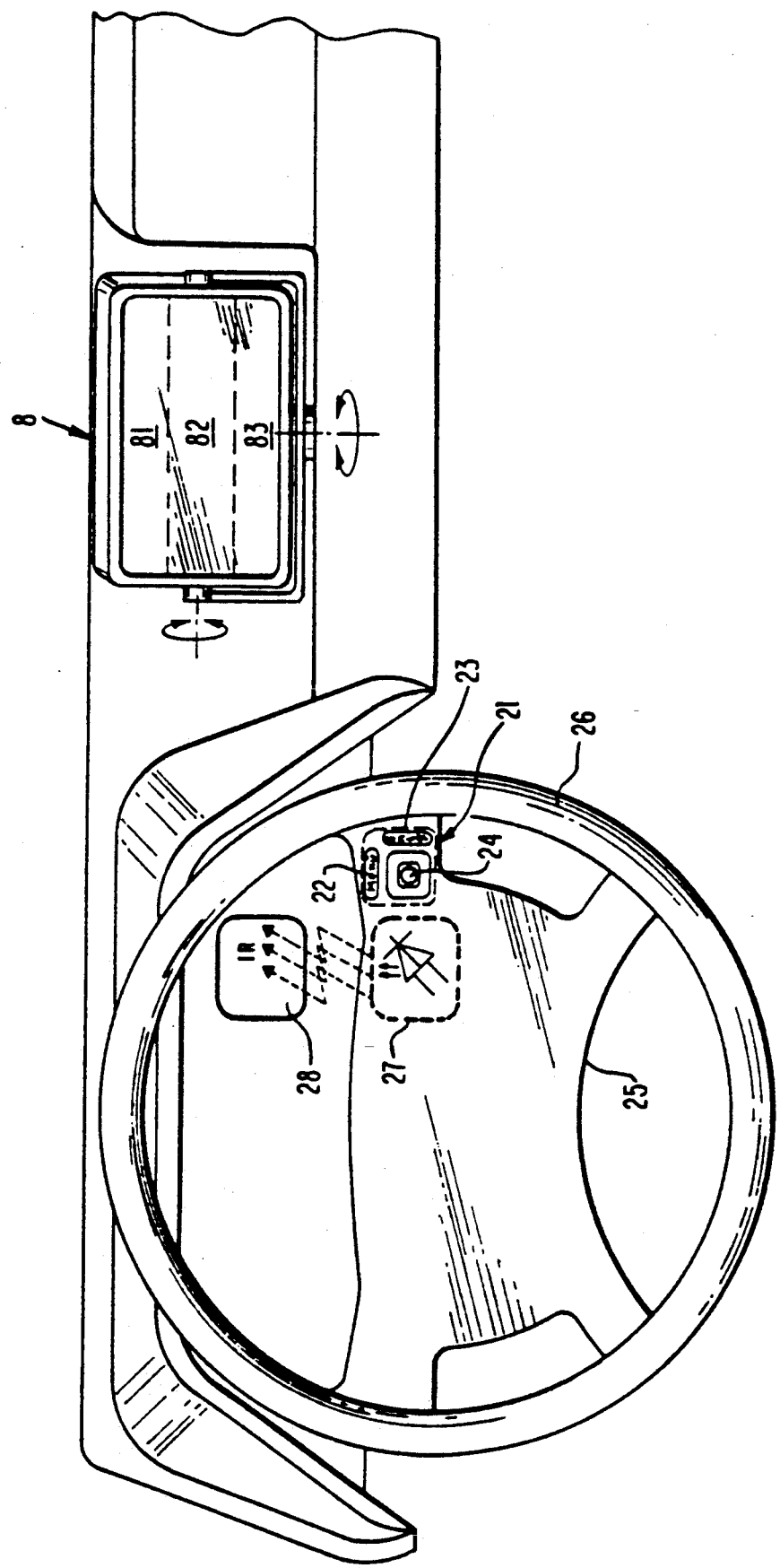
FIG. 4 is a front view of portions of a first embodiment of an information system for a motor vehicle according to the invention, which system portions are visible from the position of a driver of the vehicle.

As shown in FIG. 4 the monitor 8 can be swung on two axes so as to make it more easily observable and less disturbed by reflections.

FIG. 4 also shows a data input unit 21 which is equipped with several input buttons. It is mounted on a spoke or brace 25 of the steering wheel 26 and so disposed that it can easily be manipulated by the driver. It includes a cursor directing element 24, in the shape of the usual ball, by which the electrical equipments can be selected from the choices represented by the equipment selection region 83 of the display screen of the monitor 8. When the desired equipment is selected by the cursor control 24, the next step is to activate this equipment by pressing on the command or "enter" button 23. The "enter" button 23 is disposed to one side of the cursor control 24. Above the cursor control 24 is a menu button 22 by which the next menu relating to the selected equipment can be activated. This menu then appears in the operations region 82 of the monitor screen. If for example the menu in the operation of the auto radio is chosen, the operation command is selected from the menu with the cursor control 24. The execution of the selected command is then completed with the "enter" button 23. In this way all equipments can be switched in and controlled without diverting the invention of the driver more than minimally from the road on which he is travelling.

FIG. 4 also shows an infra-red transmitter 27 mounted on the underside of the wheel spoke 25 to establish a cordless information transmission link to the infra-red recessor 28 mounted in a hollowed-out portion of the dashboard above and to the right of the steering column. The infra-red receiver is connected to an information input of the system, such as the unit 7 of FIG. 1.

The data input unit 21 has a mode of operation such that it practically never needs more than one finger to operate it. By a dialog with the display screen the driver selects the desired operating function in a simple way. If the display visibility is impaired by sunshine or headlights, the driver can swing or turn the monitor in such a way that good readability is maintained.

The circuits, memories and software for generating legible instructions and recognizable symbols for display in a screen, as well as for displaying a movable cursor, are all well known and need not be described here. The components may be located in the monitor housing, but it may also be convenient to put at least a part of them in a separate processor unit of the system in some other nearby location.

The entry of start location, waypoints and destination for a navigation system can be done in various ways. Some navigation systems can easily store a few hundred waypoints addressable by number and callable for display in selection a list, a few at a time of which may be made visible. Some navigation systems have a quick way of registering or entering the location at the time of entry. The portion of the variable information needed from the user of the system depends upon the nature of the system, but a great deal of it can be put into the form selections from successive choices selectable by cursor. If a menu for a navigation system is provided in the form of a recognizable road network, the cursor can be used to designate start location and destination.

Figure 5:
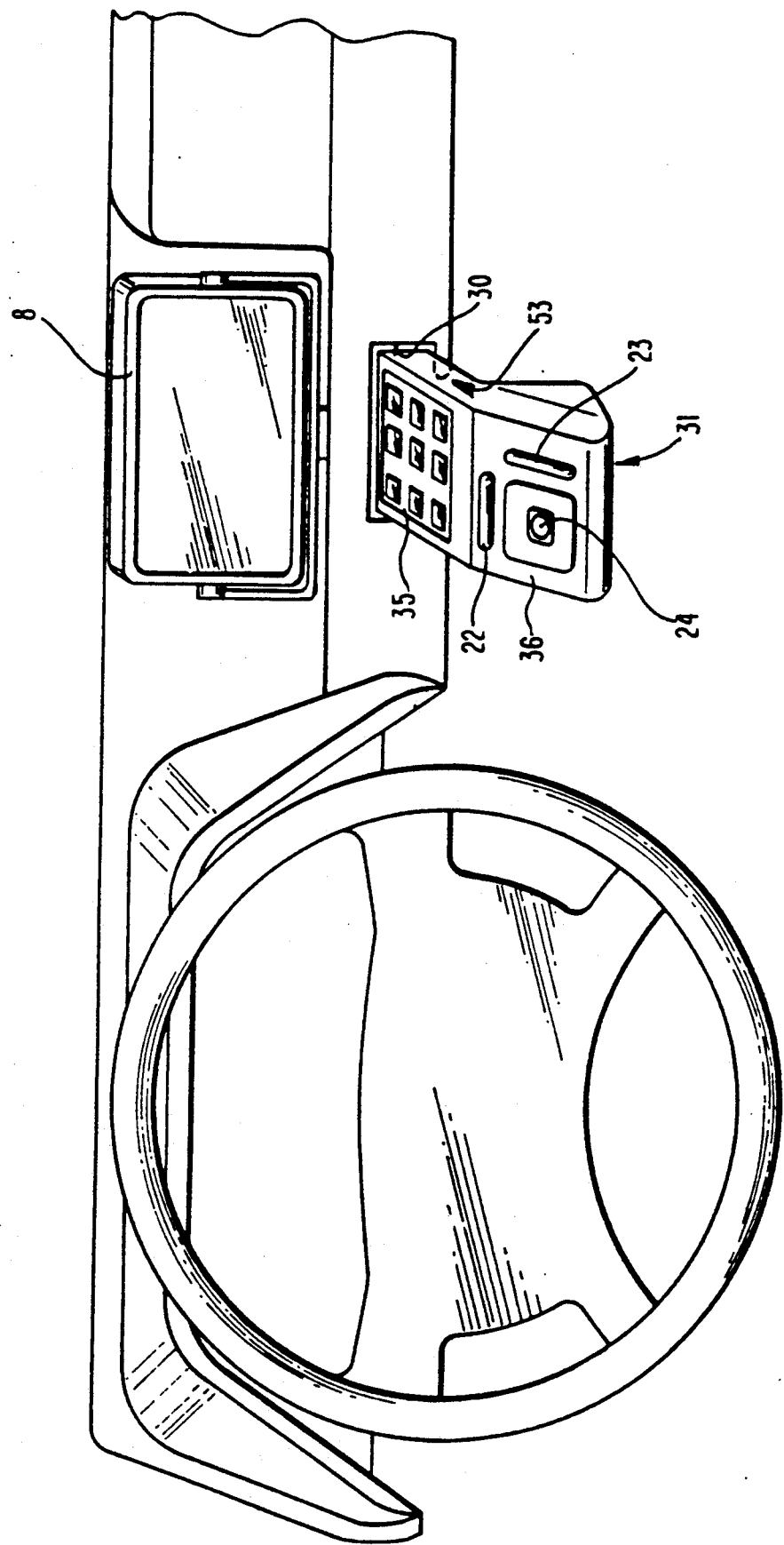
FIG. 5 is a perspective view of portions of a second embodiment of an information system for a motor vehicle, which system portions are visible from the position of a driver of the vehicle.
Figure 6:
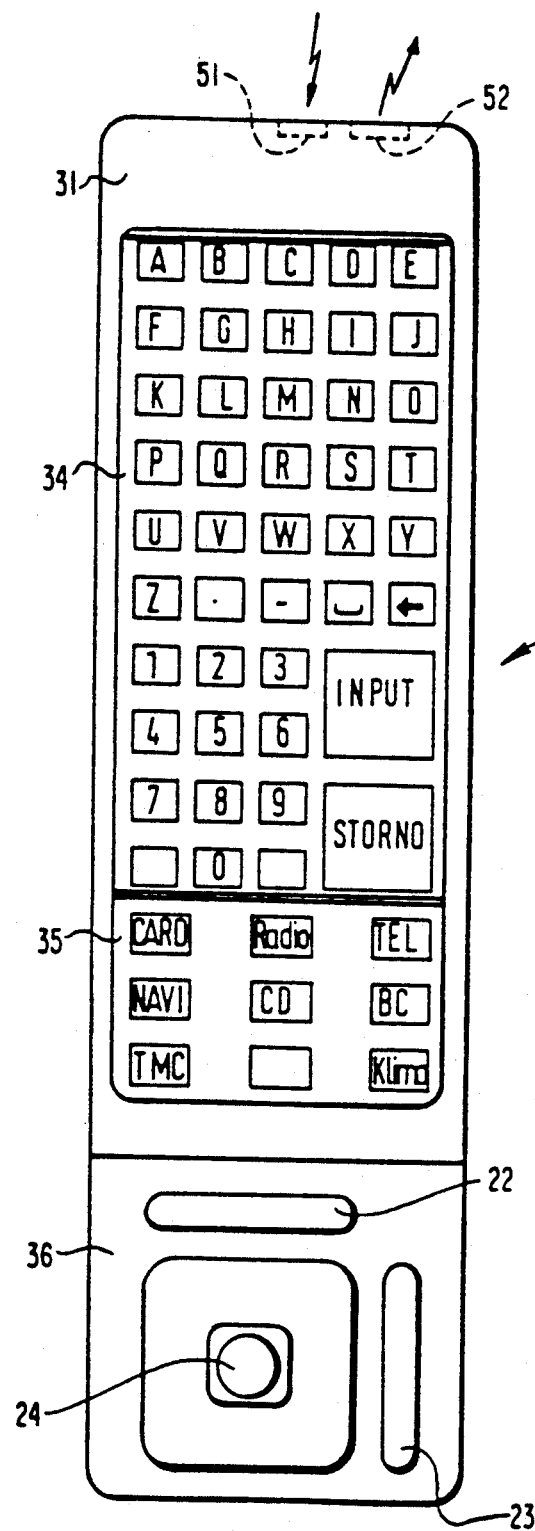
FIG. 6 is a front view.

FIG. 5 shows the input device 31 in its rest position held in a sheath 30 recessed in the dashboard of the vehicle in such a way that it can be used without removing it from its rest position. As shown in FIGS. 6 and 7, however, it can be removed and used as a telephone handset for telephone calls and also has a keyboard 34 for more complicated inputs.

The input device of FIGS. 6 and 7 has, altogether, three recessed ketboard fields on the reverse side of the telephone handset 31. In the upper region the device is an input field 34 that has a total of 44 input buttons. The "keys" of a modern keyboard are, of course, pushbuttons also. The buttons are arranged in rows in columns. The letters of the alphabet and the numerical digits 0–9 can be entered with these buttons. Two buttons are particularly emphasized by their size. The INPUT button activates data input through this alphanumeric keyboard, whereas the button marked STORNO makes corrections possible. This keyboard field can preferably be used for input of alphanumeric data such as may be needed by a radio location an pathfinding system or for calling on mobile telephone systems.

Below the input field 34 there is an adjoining selection field 35. This selection field 35 has al total of 9 buttons arranged in three rows and columns. With these buttons the user can select any of the electrical equipment provided in the vehicle. The buttons are marked with the names of the corresponding equipment. For example, with the radio button the radio broadcast receiver is switched in or switched out. Likewise, with the button marked TEL the mobile radio is switched in or out. With the button CARD availability for use can be checked, for example by transmitting a credit card number required for access to the mobile radio system. The other buttons designate the additional electrical equipments built into or installed in the vehicle. The designation and selection of electrical equipments in the motor vehicle may be in any particular variety and of course are not limited to the designations of the field 35 as illustrated in FIG. 6. The button array can be changed so that, for example, a button may be provided for a sunroof slide, raising and lowering windows or unlocking a baggage compartment. The buttons can be latched, for release in a second push, and/or illuminable, so that the activated state in the equipment can be recognized in a simple manner.

In the lower part of the input unit 21 is a so called menu field 36. It is equipped only with a cursor manipulating element 24 by means of which a cursor can be directed in x and y directions on a monitor installed in the vehicle in a manner commonly provided in many kinds of personal computers. A menu button 22 serves for showing a menu on the monitor screen, while an "enter" button 23 is used to validate the selection of a designated function in the menu. The menu button 22 and the entry button 23 are disposed at right angles to each other around half of the periphery of the cursor manipulation element 24. The cursor manipulation element 24 is of the now common spherical type that can be moved in any direction, with its movement resolved into x and y components.

As can be seen in FIG. 7, the plane on which the buttons of the various fields are mounted is somewhat deflected in its orientation in its lower portion where the menu field 36 begins. On the side of the casing opposite to the location of the input buttons, a telephone receiver and transmitter 37, 38 are mounted on the casing in the usual configuration of a telephone handset. The transmitter (microphone) 38 is mounted in the oblique extension portion just mentioned, giving the input device of the invention the configuration of a conventional telephone handset. Telephone conversations can be carried on by mobile radio telephone in the usual way by use of the units 37 and 38. The keyboard fields, with their input buttons, are recessed in the handset casing and provided with a cover 40, hinged at 41, so that they are protected against unintended operation.

At the upper end of the input unit 1, an infrared receiver 51 and an infrared transmitter 52 are built in by which data transfer and exchange with the vehicular installation (not shown) can be carried on. The construction of infrared transmitting and receiving equipment for voice and data communication is well known in the art and does not need to be further described here.

The availability of the numerical portion of alphanumeric keyboard field 34 for entering the called telephone numbers and of the TEL button of the keyboard field 35 for activating and deactivating the mobile telephone installation makes it unnecessary to provide the separate field on the same side of the device as the telephone units 37 and 38. On that side of the device, between those telephone units, there is space available for removal and replacement of a battery pack (not shown) in a compartment 43. The space occupied by the wiring and mechanism join the keyboard fields is not shown in FIG. 2 since the circuit boards and their devices mounted thereon have a sufficiently low profile for installation in a device of the configuration shown, so that no space allocation problem exists.

The manner of operation of the illustrated input device 31 is evident from the designations of the keyboard buttons. If for example it is desired to switch in the radio broadcast receiver, the user must press the RADIO button. By pressing the menu button 22 a menu appears on the monitor of the information system built into the vehicle, showing for example how there can be selected, for example, one of several broadcasting stations, a loudness setting, the frequency band or the like. The selection among the choices offered by the menu is performed with the cursor manipulating element 24. When the user has selected, by means of the cursor, a particular operation shown on the monitor, this operation is switched in by pressing on the transfer button 13. This way the user can select all the desired operation modes that are needed for settings of the radio broadcast receiver in a motor vehicle.

When in this manner all of the necessary operations for dealing with a radio receiver have been performed, the user can then select another electrical equipment by pressing on another selection button of the selection field 35. In this way two-way mobile radio may be selected. Then the numerical digit buttons of the input field 34 can be pressed in succession for entering the called number. The number can be conveniently made to appear on the monitor of the information system to confirm correct selection, so that the amount of optical attention to the keyboard can be minimized.

Figure 8:
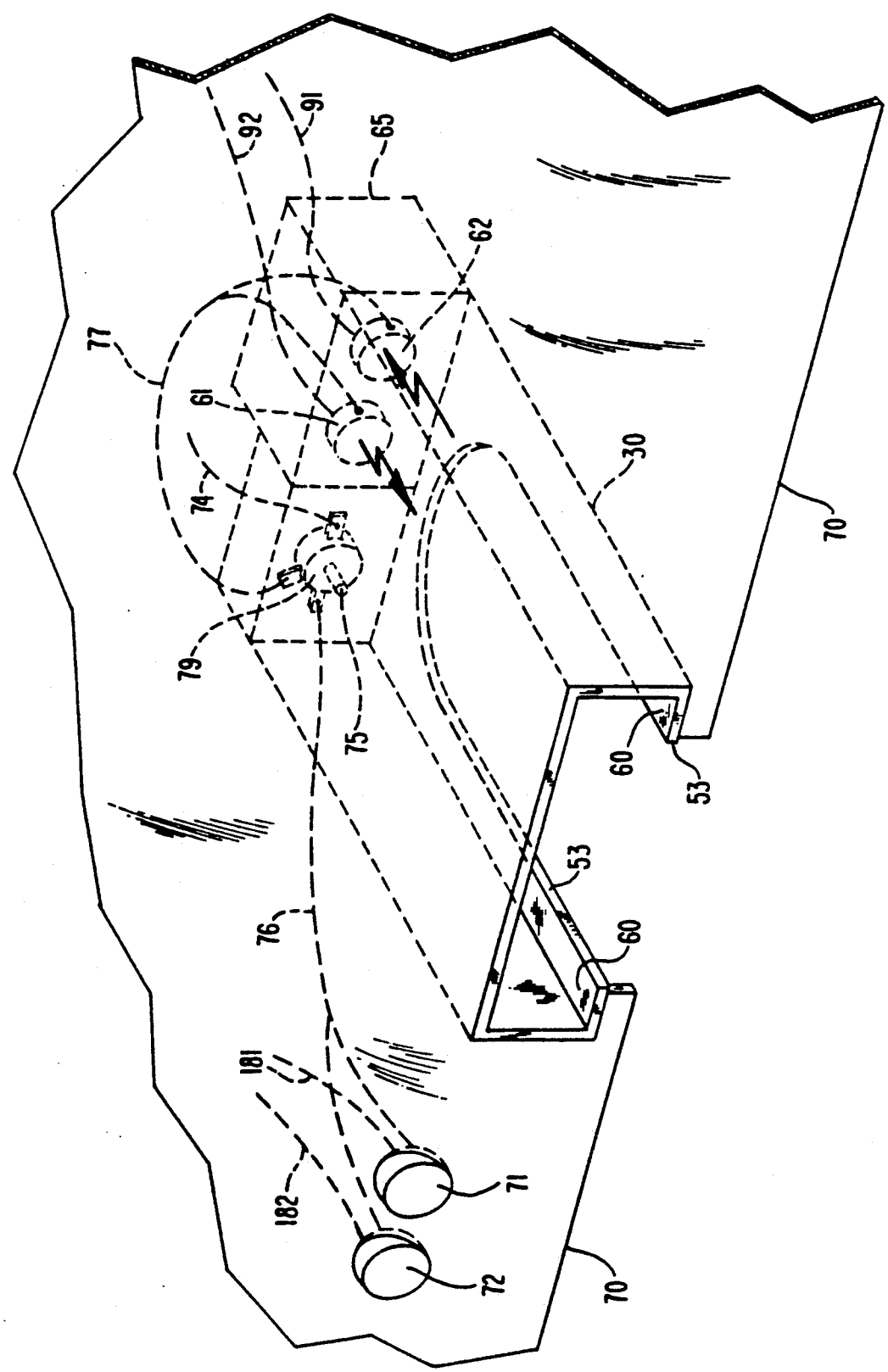
FIG. 8 is a perspective view of the recessed sheath for holding the input device 31 of FIGS. 5, 6 and 7 in its rest position.

When the user has finished with the input device 31, he or she can put it away in a holding device in the dashboard or on a console of the vehicle, as shown in FIG. 5 and FIG. 8 which holding device should have the form of a well fitting sheath. In a particular additional feature of the invention, such a holding sheath has a configuration such that the selection field 35 and the menu field 36 are freely accessible when the unit 31 is inserted in the sheath. It makes possible the easy operation of the input device 31 even in its put-away position. A slot is cut in the bottom of the sheath 30 of FIG. 5, as shown in 53, to permit the storing passage of the telephone receiver 37.

FIG. 8 is a perspective of the sheath 13, part of the rim of which is visible in FIG. 5. As explained above, it is necessary to provide a slot 53 in the bottom of the sheath 30 and also in the dashboard (70) into which the sheath provides the recessed in order to let pass the telephone receiver 37 of the input unit 31 and the rectangular body of the unit 31 as its straight end fitted into and inserted into the sheath. At the back of the sheath is a communication unit 65 containing an infrared receiver 61 and an infrared transmitter 62 similar to the infrared receiver 51 and the infrared transmitter 52 contained in the input unit 31 shown in FIG. 6. The receiver 61 is positioned so that when the unit 31 is inserted it will receive signals that may be transmitted from the infrared transmitter 52 of the unit 31 and the transmitter 62 is positioned so as to be able to transmit to the receiver 51 of the unit 31 when the unit 31 is in place in the sheath. This enables the portions 35 and 36 of the unit 31 to be used as in input to the system when the unit 31 is in the sheath. When the unit 31 is out of the sheath a straight end can be pointed so that it transmits to and receives from the infrared units 71 and 72 mounted on the dashboard. These face somewhat down in the illustrated case, merely to show that they can be mounted to suit the situation, perhaps to enable the unit 31 to be used held in one hand and resting on the user's knee. When the unit 31 is inserted in the sheath 30 it presses the actuator 75 of a switch 76 so that the power for operating units 71 and 72 is cut-off from the supply line 76 and is transferred to the supply line 77 for energizing the infrared receiver and transmitter 61 and 62. Of course there are also data connections 81 and 82 for the units 71 and 72 and likewise data connections 91 and 92 for the units 61 and 62. The line 74 goes to the automobile battery through a distribution panel (not shown).

Figure 9:
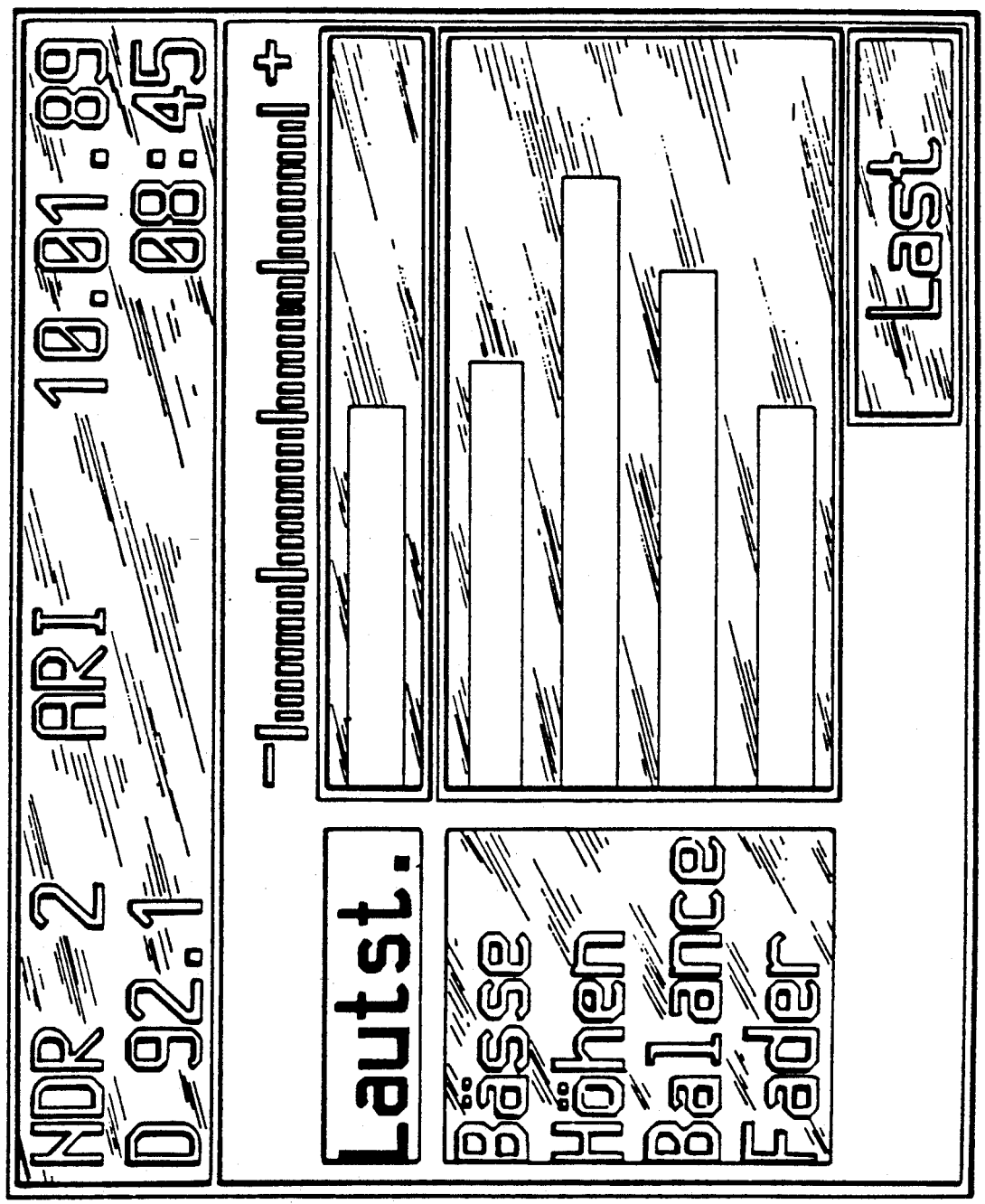
FIG. 9 is an illustrative example of a display on a monitor of an information system for a motor vehicle according to the invention.
Figure 10:
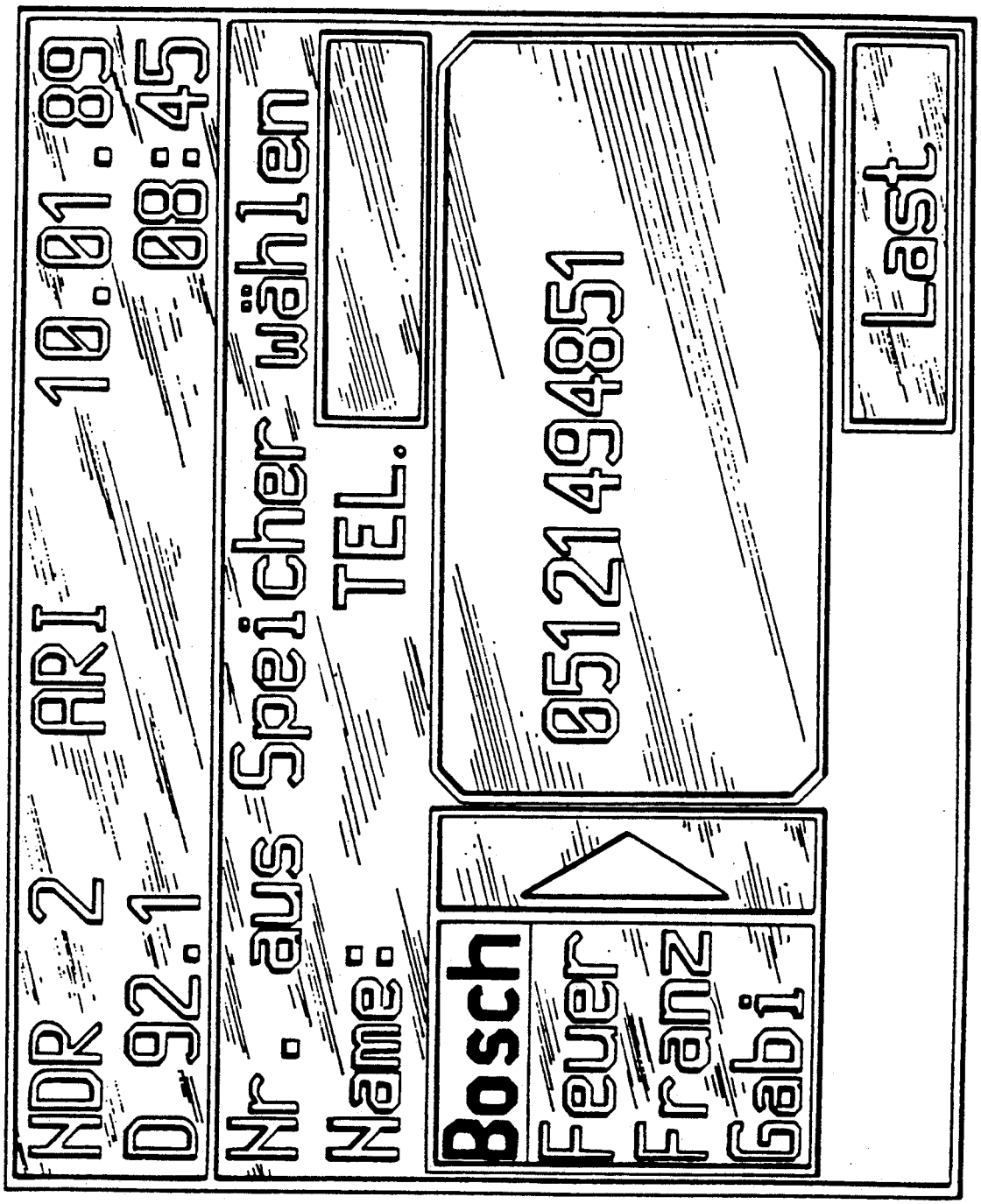
FIG. 10 is a second illustrative example of a display on a monitor of an information system for a motor vehicle according to the invention.

FIGS. 9 and 10 show displays on a monitor 8 in an embodiment of the system of the invention in which the input device 31 does not have keyboard field 35 and uses the cursor to select equipments to adjust or operate. Accordingly, the monitor 8 does not have the region 83 subdivided in terms of the peripheral equipments.

FIG. 9 shows a display on the screen of the monitor 8 for the case of adjustment of the loudness of the reception of a radio station which provides a normal program and has a subcarrier for traffic announcements which can be decoded. The station (and the frequency) to which the receiver is tuned are shown at the upper left, namely station 2 of the North German Radio. At the middle of top of the display are the initials ARI designating that the traffic signal decoding function is operating. The date and time are at the top right. At this stage the driver is adjusting the loudness of the program reception, having selected the loudness control ("Lautstärke" in German) by manipulating a cursor, after which the enter button has been pushed extinguishing the cursor and lighting up the "Lautst." Label in black on white. Above the graph bar indicating the loudness level of the received signal, scale marks are shown in white-on-black lines.

The other selectable controls are labeled in white-on-black instead of black on white, since they have not been selected for adjustment. With the illustrated function selection, the loudness can be increased or decreased by means of the ball control for the cursor. The volume control setting thus made will then be preserved by again depressing the enter button, so that the next function can thereafter be dealt with. At this time the "lautst." label reverts to white-on-black display.

Any of the other controls of the menu here presented can be selected next with the cursor, which reappears as soon as all the functions are showing in white-on-black. After having made all of the desired adjustments, the user can then put the cursor on the field "Last", which jumps the program back to the basic menu, which can then be summoned by pressing the menu button 22 if the user has more operations to achieve.

FIG. 10 is a display illustrating one way of dealing with telephone calls to or from a vehicle. Since the driver does not want to miss any traffic announcements during his telephone call (the traffic announcements go into system memory and thus will not interrupt his telephone call), the upper part of the display continues to indicate that the auto radio is still tuned to a broadcast station and that the ARI function is operating. This function is important enough to be shown in the upper subdivision of the screen.

In the next lower subdivision of the screen "TEL." shows that the telephone call function is in progress and also designates that the number shown in the field below is a telephone number. Across the top of the operations area of the screen is the instruction (in German) "Select number from memory". At the left, above the list of names and in the operations portion of the screen, the heading "NAME:" indicates that the choice is to be made from the list appearing below it.

In this case the user has called up the number of his employer and a key word (Bosch) of the employer's name accordingly appears in black letters on white, while all the other lettering and numbers are shown in white letters and numbers on black. This is also true of the selected telephone number. In this case the frequency of operation for the mobile telephone service is not displayed, since it is assumed that the vehicle is equipped to operate only on a particular mobile telephone channel.

The list of names shown in FIG. 10 is very short, but it is part of a longer list. When the list first appears, a field (not shown) appears in the operations area with the words

LIST:
UP  DOWN for moving the list in case the desired name is not among those displayed. After a displayed name is selected, by the cursor, and its telephone number is called up by the "enter" button, the list control field is extinguished.

In FIG. 9 the operations portion of the screen is used as an extension of the menu portion, illustrating the flexibility of the system.

FIGS. 9 and 10 do not show the normally present outputs of the instruments showing engine operating conditions, such as fuel supply, engine temperature, etc. These may be blanked out during interactive control of peripheral equipment. Some such indications, for example, vehicle speed, must always be prominently displayed, whether in a separate display, as is now conventional, or in a reserved position in the upper part of the monitor 8.

Although the invention has been described with reference to particular illustrative examples, it will be understood that variations and modifications are possible within the inventive concept.

We claim:

1. An input subsystem for an information system of a motor vehicle including an input device comprising a voice transmitter (38) and a voice receiver (37) at opposite ends of a hand-grippable elongate casing, said device having an input keyboard on the side of said casing opposite said transmitter and receiver, said keyboard being composed of a first input field (34) equipped with an alphanumeric keyboard and a second input field (35) implemented by a keyboard portion for designating any of a plurality of selectable auxiliary equipments in said vehicle for activation or operation, said input device also having wireless data transmission and reception means (52, 51) for data and voice communication with a corresponding transmission and reception means (62, 61; 72, 71) installed in said vehicle, said input subsystem including a close fitting holding sheath mounted in fixed position in said vehicle for insertion of the casing of said input device therein, holding said casing in a predetermined position therein or removal of said casing and said input device therefrom, said sheath being of a configuration such that when said casing is held therein, at least one (36) of said fields of said keyboard is exposed and usable.

2. The input subsystem of claim 1, including also a monitor having a screen for visible display of information, including menu information stored in said information system, and wherein said keyboard of said input device includes a third field (36) which is a menu field implemented with manually operable means (24) for positioning a cursor on said display screen of said monitor.

3. The input subsystem of claim 1, wherein said wireless data transmission and reception means of said input device comprise infrared transmitter means and infrared receiver means, and said input subsystem includes corresponding infrared receiver means and infrared transmitter means in fixed position in said vehicle for providing communication between said input device and other equipment in said vehicle by means of infrared radiation.

4. The input subsystem of claim 1, wherein said first and second input fields (34, 35) of said keyboard of said input device are recessed with respect to adjacent edges of said casing of said input device.

5. The input subsystem of claim 2, wherein said sheath is of a configuration requiring that said menu field (36) and said second field (35) of the input device are exposed when said casing thereof is held in said predetermined position in said sheath.

* * * * *